(12) United States Patent
Tsai et al.

(10) Patent No.: US 12,303,888 B2
(45) Date of Patent: May 20, 2025

(54) METHOD TO PRODUCE CHEMICAL PATTERN IN MICRO-FLUIDIC STRUCTURE

(71) Applicant: Illumina, Inc., San Diego, CA (US)

(72) Inventors: Shang-Ying Tsai, Pingzhen (TW); Li-Min Hung, Longtan Township (TW); Jung-Huei Peng, Jhubei (TW); Shane Bowen, San Diego, CA (US); Hui Han, San Diego, CA (US); Danny Chan, San Diego, CA (US); Sang Park, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 612 days.

(21) Appl. No.: 17/683,293

(22) Filed: Feb. 28, 2022

(65) Prior Publication Data
US 2022/0184614 A1    Jun. 16, 2022

Related U.S. Application Data

(60) Division of application No. 16/677,501, filed on Nov. 7, 2019, now Pat. No. 11,298,697, which is a
(Continued)

(51) Int. Cl.
| | |
|---|---|
| *B01L 3/00* | (2006.01) |
| *B32B 37/30* | (2006.01) |
| *B82Y 30/00* | (2011.01) |

(52) U.S. Cl.
CPC ... *B01L 3/502707* (2013.01); *B01L 3/502715* (2013.01); *B32B 37/30* (2013.01);
(Continued)

(58) Field of Classification Search
CPC ......... B01L 3/502707; B01L 3/502715; B01L 2200/12; B01L 2300/0636;
(Continued)

(56) References Cited

U.S. PATENT DOCUMENTS

| | | |
|---|---|---|
| 3,950,649 A | 4/1976 | Yonekubo |
| 4,222,743 A | 9/1980 | Wang |

(Continued)

FOREIGN PATENT DOCUMENTS

| | | |
|---|---|---|
| CN | 101498656 A | 8/2009 |
| CN | 101598717 A | 12/2009 |

(Continued)

OTHER PUBLICATIONS

Non-Final Office Action issued Dec. 22, 2023 in U.S. Appl. No. 17/727,622.
(Continued)

*Primary Examiner* — Brian J. Sines
(74) *Attorney, Agent, or Firm* — Illumina, Inc.

(57) ABSTRACT

A flow cell includes: a first substrate; a second substrate; a first resin layer disposed over an inner surface of the first substrate; a second resin layer disposed over an inner surface of the second substrate; a first plurality of biological capture sites located at the first resin layer; a second plurality of biological capture sites located at the second resin layer; and a polymer layer interposed between the first resin layer and the second resin layer, such that the first substrate is attached to the second substrate via at least the first resin layer, the polymer layer, and the second resin layer, wherein the polymer layer defines a plurality of microfluidic channels that extend through polymer layer.

17 Claims, 11 Drawing Sheets

Related U.S. Application Data continuation of application No. 15/603,128, filed on May 23, 2017, now Pat. No. 10,486,153, which is a division of application No. 15/167,764, filed on May 27, 2016, now Pat. No. 9,656,260, which is a division of application No. 14/040,303, filed on Sep. 27, 2013, now Pat. No. 9,352,315.

(52) U.S. Cl.
CPC .............. *B01J 2219/00286* (2013.01); *B01J 2219/00382* (2013.01); *B01J 2219/00637* (2013.01); *B01L 2200/12* (2013.01); *B01L 2300/0636* (2013.01); *B01L 2300/0877* (2013.01); *B01L 2300/0887* (2013.01); *B01L 2300/0896* (2013.01); *B01L 2300/12* (2013.01); *B32B 2307/412* (2013.01); *B82Y 30/00* (2013.01)

(58) Field of Classification Search
CPC ..... B01L 2300/0877; B01L 2300/0887; B01L 2300/0896; B01L 2300/12; B32B 37/30; B32B 2307/412; B01J 2219/00286; B01J 2219/00382; B01J 2219/00637; B82Y 30/00
See application file for complete search history.

(56) References Cited

U.S. PATENT DOCUMENTS

| | | |
|---|---|---|
| 4,563,062 A | 1/1986 | Kanatani |
| 5,184,021 A | 2/1993 | Smith |
| 5,324,633 A | 6/1994 | Fodor et al. |
| 5,422,712 A | 6/1995 | Ogino |
| 5,451,683 A | 9/1995 | Barrett et al. |
| 5,482,867 A | 1/1996 | Barrett et al. |
| 5,491,074 A | 2/1996 | Aldwin et al. |
| 5,599,675 A | 2/1997 | Brenner |
| 5,624,711 A | 4/1997 | Sundberg et al. |
| 5,646,411 A | 7/1997 | Kain et al. |
| 5,744,305 A | 4/1998 | Fodor et al. |
| 5,750,341 A | 5/1998 | Macevicz |
| 5,795,716 A | 8/1998 | Chee |
| 5,831,070 A | 11/1998 | Pease et al. |
| 5,856,101 A | 1/1999 | Hubbell et al. |
| 5,858,659 A | 1/1999 | Sapolsky et al. |
| 5,874,219 A | 2/1999 | Rava et al. |
| 5,945,334 A | 8/1999 | Besemer et al. |
| 5,968,740 A | 10/1999 | Fodor et al. |
| 5,974,164 A | 10/1999 | Chee |
| 5,981,185 A | 11/1999 | Matson et al. |
| 5,981,956 A | 11/1999 | Stern |
| 6,022,963 A | 2/2000 | McGall et al. |
| 6,025,601 A | 2/2000 | Trulson et al. |
| 6,033,860 A | 3/2000 | Lockhart et al. |
| 6,083,697 A | 7/2000 | Beecher et al. |
| 6,090,555 A | 7/2000 | Fiekowsky et al. |
| 6,136,269 A | 10/2000 | Winkler et al. |
| 6,291,183 B1 | 9/2001 | Pirrung et al. |
| 6,309,831 B1 | 10/2001 | Goldberg et al. |
| 6,321,791 B1 | 11/2001 | Chow |
| 6,327,410 B1 | 12/2001 | Walt et al. |
| 6,355,431 B1 | 3/2002 | Chee et al. |
| 6,416,949 B1 | 7/2002 | Dower et al. |
| 6,428,752 B1 | 8/2002 | Montagu |
| 6,440,748 B1 | 8/2002 | Katerkamp et al. |
| 6,482,591 B2 | 11/2002 | Lockhart et al. |
| 6,509,085 B1 | 1/2003 | Kennedy |
| 6,569,382 B1 | 5/2003 | Edman et al. |
| 6,582,660 B1 | 6/2003 | Heller et al. |
| 6,644,944 B2 | 11/2003 | Karp |
| 6,652,808 B1 | 11/2003 | Heller et al. |
| 6,770,441 B2 | 8/2004 | Dickinson et al. |
| 6,776,094 B1 | 8/2004 | Whitesides et al. |
| 6,844,184 B2 | 1/2005 | Kim et al. |
| 6,919,211 B1 | 7/2005 | Fodor et al. |
| 6,967,074 B2 | 11/2005 | Duffy et al. |
| 7,030,383 B2 | 4/2006 | Babayoff et al. |
| 7,033,819 B2 | 4/2006 | Kim et al. |
| 7,057,026 B2 | 6/2006 | Barnes et al. |
| 7,067,306 B2 | 6/2006 | Singhvi et al. |
| 7,109,458 B2 | 9/2006 | Fairley et al. |
| 7,115,400 B1 | 10/2006 | Adessi et al. |
| 7,244,559 B2 | 7/2007 | Rothberg et al. |
| 7,329,860 B2 | 2/2008 | Feng et al. |
| 7,344,627 B2 | 3/2008 | Broadley et al. |
| 7,351,376 B1 | 4/2008 | Quake et al. |
| 7,445,027 B2 | 11/2008 | Flachsbart et al. |
| 7,473,453 B2 | 1/2009 | Fisher |
| 8,039,817 B2 | 10/2011 | Feng et al. |
| 8,071,962 B1 | 12/2011 | Feng et al. |
| 8,143,599 B2 | 3/2012 | Feng et al. |
| 8,242,463 B2 | 8/2012 | Feng et al. |
| 8,278,630 B1 | 10/2012 | Feng et al. |
| 8,313,906 B2 | 11/2012 | Cao et al. |
| 8,323,900 B2 | 12/2012 | Handique et al. |
| 8,357,530 B2 | 1/2013 | Matsunaga et al. |
| 8,372,577 B2 | 2/2013 | Tanaka et al. |
| 8,398,936 B2 | 3/2013 | Horiuchi et al. |
| 8,445,194 B2 | 5/2013 | Drmanac et al. |
| 8,507,180 B2 | 8/2013 | Washio et al. |
| 8,546,772 B2 | 10/2013 | Feng et al. |
| 8,586,947 B1 | 11/2013 | Feng et al. |
| 8,637,242 B2 | 1/2014 | Washio et al. |
| 8,698,102 B2 | 4/2014 | Feng et al. |
| 8,702,948 B2 | 4/2014 | Ronaghi et al. |
| 8,778,849 B2 | 7/2014 | Bowen et al. |
| 8,820,883 B2 | 9/2014 | Wang et al. |
| 8,900,529 B2 | 12/2014 | Shaikh et al. |
| 8,951,716 B2 | 2/2015 | Liu et al. |
| 8,951,781 B2 | 2/2015 | Reed et al. |
| 9,039,997 B2 | 5/2015 | Cohen et al. |
| 9,068,220 B2 | 6/2015 | Feng et al. |
| 9,073,962 B2 | 7/2015 | Fracchia et al. |
| 9,114,396 B2 | 8/2015 | Tsai et al. |
| 9,352,315 B2 | 5/2016 | Tsai et al. |
| 9,365,898 B2 | 6/2016 | Feng et al. |
| 9,458,485 B2 | 10/2016 | Schultz et al. |
| 9,512,422 B2 | 12/2016 | Barnard et al. |
| 9,515,159 B2 | 12/2016 | Bischopink et al. |
| 9,656,260 B2 | 5/2017 | Tsai et al. |
| 9,764,505 B2 | 9/2017 | Guenther et al. |
| 9,809,852 B2 | 11/2017 | Esfandyarpour et al. |
| 9,958,465 B2 | 5/2018 | Ang et al. |
| 10,486,153 B2 | 11/2019 | Tsai et al. |
| RE48,219 E | 9/2020 | Feng et al. |
| RE48,561 E | 5/2021 | Feng et al. |
| 2002/0030811 A1 | 3/2002 | Schindler |
| 2002/0094572 A1 | 7/2002 | Singhvi et al. |
| 2002/0102578 A1 | 8/2002 | Dickinson et al. |
| 2002/0139936 A1 | 10/2002 | Dumas |
| 2002/0143111 A1 | 10/2002 | Halverson et al. |
| 2003/0008310 A1 | 1/2003 | Williams et al. |
| 2003/0011772 A1 | 1/2003 | Abe et al. |
| 2003/0032048 A1 | 2/2003 | Kim et al. |
| 2003/0108900 A1 | 6/2003 | Oliphant et al. |
| 2003/0112432 A1 | 6/2003 | Yguerabide et al. |
| 2003/0152490 A1 | 8/2003 | Trulson et al. |
| 2003/0156992 A1 | 8/2003 | Anderson et al. |
| 2003/0215821 A1 | 11/2003 | Gunderson et al. |
| 2004/0096831 A1 | 5/2004 | Hughes |
| 2004/0121066 A1 | 6/2004 | Anderson et al. |
| 2004/0175710 A1 | 9/2004 | Haushalter |
| 2004/0185483 A1 | 9/2004 | Stuelpnagel et al. |
| 2004/0248287 A1 | 12/2004 | Hu et al. |
| 2005/0057798 A1 | 3/2005 | Osborne et al. |
| 2005/0064432 A1 | 3/2005 | Huang et al. |
| 2005/0100900 A1 | 5/2005 | Kawashima et al. |
| 2005/0181394 A1 | 8/2005 | Steemers et al. |
| 2005/0191698 A1 | 9/2005 | Chh et al. |
| 2005/0205422 A1 | 9/2005 | Moser et al. |
| 2005/0221271 A1 | 10/2005 | Murphy et al. |
| 2005/0236361 A1 | 10/2005 | Ufer et al. |

(56) References Cited

U.S. PATENT DOCUMENTS

| | | |
|---|---|---|
| 2005/0272142 A1 | 12/2005 | Horita |
| 2006/0065528 A1 | 3/2006 | Lopez et al. |
| 2006/0188901 A1 | 8/2006 | Barnes et al. |
| 2006/0240439 A1 | 10/2006 | Smith et al. |
| 2006/0253035 A1 | 11/2006 | Stern |
| 2006/0281109 A1 | 12/2006 | Barr Ost et al. |
| 2006/0292611 A1 | 12/2006 | Berka et al. |
| 2007/0000866 A1 | 1/2007 | Ryan et al. |
| 2007/0085334 A1 | 4/2007 | Watanabe et al. |
| 2007/0114362 A1 | 5/2007 | Feng et al. |
| 2007/0166705 A1 | 7/2007 | Milton et al. |
| 2008/0202694 A1 | 8/2008 | Serbicki et al. |
| 2008/0261288 A1 | 10/2008 | Gonda et al. |
| 2008/0262747 A1 | 10/2008 | Kain et al. |
| 2008/0274905 A1 | 11/2008 | Greene |
| 2008/0292502 A1 | 11/2008 | Kitawaki et al. |
| 2008/0297911 A1 | 12/2008 | Christenson et al. |
| 2009/0068759 A1 | 12/2009 | Arenas et al. |
| 2009/0298191 A1 | 12/2009 | Whitesides et al. |
| 2009/0309049 A1 | 12/2009 | Van Dijk et al. |
| 2010/0111768 A1 | 5/2010 | Bnerjee et al. |
| 2010/0193704 A1 | 8/2010 | Pratt et al. |
| 2010/0210008 A1 | 8/2010 | Strand et al. |
| 2010/0233696 A1 | 9/2010 | Joseph et al. |
| 2010/0327184 A1 | 12/2010 | Hayashi |
| 2011/0091864 A1 | 4/2011 | Karlsson et al. |
| 2011/0195260 A1 | 8/2011 | Lee et al. |
| 2012/0004140 A1 | 1/2012 | Staker |
| 2012/0182609 A1 | 7/2012 | Borenstein et al. |
| 2012/0184046 A1 | 7/2012 | Atkin |
| 2012/0319180 A1 | 12/2012 | Chuang et al. |
| 2013/0186575 A1 | 7/2013 | Fujita et al. |
| 2013/0199732 A1 | 8/2013 | Niwa et al. |
| 2013/0344290 A1 | 12/2013 | Yu et al. |
| 2014/0155297 A1 | 6/2014 | Heinz |
| 2014/0243224 A1 | 8/2014 | Barnard et al. |
| 2014/0256030 A1 | 9/2014 | Shen et al. |
| 2014/0272719 A1 | 9/2014 | Liu et al. |
| 2014/0349870 A1 | 11/2014 | Aizenberg et al. |
| 2014/0371091 A1 | 12/2014 | Wiktor et al. |
| 2015/0045234 A1 | 2/2015 | Stone et al. |
| 2015/0087007 A1 | 3/2015 | Meldrum et al. |
| 2015/0093303 A1 | 4/2015 | Tsai et al. |
| 2015/0196912 A1 | 7/2015 | Tsai et al. |
| 2015/0328633 A1 | 11/2015 | Yoo |
| 2015/0367346 A1 | 12/2015 | Foster et al. |
| 2015/0375226 A1 | 12/2015 | Yoo |
| 2016/0023208 A1 | 1/2016 | Fisher et al. |
| 2016/0047770 A1 | 2/2016 | Tyler et al. |
| 2016/0318016 A1 | 11/2016 | Hou et al. |
| 2017/0326548 A1 | 5/2017 | Tsai et al. |
| 2017/0151584 A1 | 6/2017 | Wiesner et al. |
| 2017/0199210 A1 | 7/2017 | Ang et al. |
| 2018/0299380 A1 | 10/2018 | Makino et al. |
| 2020/0009556 A1 | 1/2020 | Zimmerley et al. |
| 2020/0070153 A1 | 3/2020 | Tsai et al. |
| 2020/0347273 A1 | 11/2020 | Stockholm et al. |

FOREIGN PATENT DOCUMENTS

| | | |
|---|---|---|
| CN | 101807705 A | 8/2010 |
| DE | 10014204 A1 | 10/2001 |
| DE | 10 2004 052 495 A1 | 5/2006 |
| JP | 2007-163410 A | 6/2007 |
| JP | 2007-183258 A | 7/2007 |
| JP | 2009-500278 A | 1/2009 |
| JP | 2015-523577 A | 8/2015 |
| JP | 2016-533283 A | 10/2016 |
| RU | 2291402 C1 | 1/2007 |
| TW | 201335304 A | 9/2013 |
| WO | WO-98/44151 A1 | 10/1998 |
| WO | WO-00/18957 A1 | 4/2000 |
| WO | WO-00/63437 A2 | 10/2000 |
| WO | WO-2005/065814 A1 | 7/2005 |
| WO | WO-2006/064199 A1 | 6/2006 |
| WO | WO-2006/106608 A1 | 10/2006 |
| WO | WO-2007/005711 A1 | 1/2007 |
| WO | WO-2007/010251 A2 | 1/2007 |
| WO | WO-2007/123744 A2 | 11/2007 |
| WO | WO-2010/009543 A1 | 1/2010 |
| WO | WO-2010/099350 A2 | 9/2010 |
| WO | WO-2014/018805 A2 | 1/2014 |
| WO | WO-2015/056031 A1 | 4/2015 |
| WO | WO-2017/115863 A1 | 7/2017 |
| WO | WO-2018/032112 A1 | 2/2018 |
| WO | WO-2020/055732 A1 | 3/2020 |
| WO | WO-2020/236945 A1 | 11/2020 |

OTHER PUBLICATIONS

Office Action issued in JP App No. JP2020-572873 dated Jan. 9, 2024.
U.S. Appl. No. 17/214,093, filed Mar. 26, 2021, Feng et al.
Applichem GMBH (Darmstadt, Germany), "Contaminations by Nucleic Acids, Problems and Practical Solutions," Nucleic acid decontamination, Brochure, 2008, 1-64.
Chinese Patent Application No. 20098116690.4, Office Action dated Feb. 28, 2013, 9 pages.
Chou et al., "Integrated Elastomer Fluidic Lab-on-a-chip-Surface Patterning and DNA Diagnostics," Proceedings of the Solid State Actuator and Sensor Workshop, Hilton Head, South Carolina, 2000, 4 pages.
Dworkin, M. et al., "Life at High Temperatures," Chapter 1.7, The Prokaryotes: A Handbook on the Biology of Bacteria, Third Edition, vol. 2: Ecophysiology and Biochemistry, 2006, 183-188.
Eddings, M. et al., "Determining the optimal PDMS-PDMS bonding technique for microfluidic devices," J. Micromech. Microeng., 18, 067001, 2008, 4 pages.
EP Application No. 09743421.1, Communication Pursuant to Article 94(3) EPC, Oct. 2, 2015, 4 pages.
Fiorini, G. et al., "Disposable microfluidic devices: fabrication, function, and application," BioTechniques, vol. 38 (3), Mar. 2005, 429-446.
Flachsbart, B. et al., "Design and fabrication of a multilayered polymer microfluidic chip with nanofluidic interconnects via adhesive contact printing," Lab on a Chip, 6, 2006, 667-674.
Gerday, C. et al., "Extremophiles," Encyclopedia of life support systems (EOLSS), 2009, 194-203.
Grogan, D., "Hyperthermophiles and the problem of DNA instability," Molecular Microbiology, vol. 28 (6), 1998, 1043-1049.
Grover, W. et al., "Monolithic membrane valves and diaphragm pumps for practical large-scale integration into glass microfluidic devices," Sensors and Actuators B, 89, 2003, 315-323.
Karni, M. et al., "Thermal Degradation of DNA," DNA and Cell Biology, vol. 32 (6), 2013, 1-4.
Kim, J. et al., "Rapid prototyping of microfluidic systems using a PDMS/polymer tape composite," Lab on a Chip, vol. 9, 2009, 1290-1293.
Koch Lab: Protocols/Flow cell, https://openwetware.org/mediawiki/index.php?title=Koch_Lab:Protocols/Flow_cell&oldid=397835, accessed on Oct. 25, 2017.
Lee, H.-J. et al., "SPR Imaging Measurements of 1-D and 2-D DNA Microarrays Created from Microfluidic Channels on Gold Thin Films," Anal. Chem. 2001, 73, 2001, 5525-5531.
Lindahl, T. et al., "Rate of Depurination of Native Deoxyribonucleic Acid," Biochemistry, vol. 11 (19), 1972, 3610-3618.
Lindahl, T., "Instability and Decay of the Primary Structure of DNA," Nature, vol. 362, Apr. 22, 1993, 709-715.
Long, Z. et al., "Integrated multilayer microfluidic device with a nanoporous membrane interconnect for online coupling of solid-phase extraction to microchip electrophoresis," Lab Chip, 7, 2007, 1819-1824.
Marguet, E. et al., "DNA stability at temperatures typical for hyperthermophiles," Nucleic acids research, vol. 22 (9), 1994, 1681-1686.
Meyers, R., "Denaturation of DNA," Molecular Biology and Biotechnology: A Comprehensive Desk Reference, 1995, 206-207.

(56) References Cited

OTHER PUBLICATIONS

Ong, S.E. et al., "Fundamental principles and applications of microfluidic systems," Frontiers in Bioscience, vol. 13, Jan. 1, 2008, 2757-2773.

Shendure, et al., "Accurate Multiplex Polony Sequencing of an Evolved Bacterial Genome," Science, vol. 309, Sep. 9, 2005, 1728-1732.

Stroock, A. et al., "Components for integrated poly(dimethylsiloxane) microfluidic systems," Electrophoresis, 23, 2002, 3461-3473.

Sun Wei, "Scanning Probe Microscopy Imaging of Biological Origin and FDTD Simulation of Optical Tweezers," Doctor's Degree Theses from Dalian University of Technology, 2006, 60-67.

Yuen, P.K. et al., "Microfluidic devices for fluidic circulation and mixing improve hybridization signal intensity on DNA arrays," Lab Chip, 3, 2003, 46-50.

Zhang, M. et al., "A simple method for fabricating multi-layer PDMS structures for 3D microfluidic chips," Lab Chip, 10, 2010, 1199-1203.

Office Action issued on Jun. 25, 2020 in U.S. Appl. No. 16/000,720 (RE48219).

Notice of Allowance issued on Dec. 31, 2020 in U.S. Appl. No. 16/000,720 (RE48219).

Office Action issued on Apr. 18, 2019 in U.S. Appl. No. 15/603,128 (U.S. Pat. No. 10,486,153).

Matsunaga et al., "High-Efficiency Single-Cell Entrapment and Fluorescence in Situ Hybridization Analysis Using a Poly(dimethylsiloxane) Microfluidic Device Integrated with a Black Poly(ethylene terephthalate) Micromesh," Analytical Chemistry, vol. 80, No. 13, (Jun. 7, 2008) pp. 5139-5145 (Year: 2008).

Office Action issued on May 13, 2021, in U.S. Appl. No. 16/457,667 (US 2020-009556).

Final Office Action issued on Sep. 7, 2021 in U.S. Appl. No. 16/457,667 (US 2020-009556).

US Office Action issued on Dec. 24, 2021 in U.S. Appl. No. 16/457,667 (US 2020-0009556).

Office Action issued in JP App No. 2020-572873 dated Jun. 6, 2023.

U.S. Appl. No. 17/683,293, filed Feb. 28, 2022, Shang-Ying Tsai et al.

Extended European Search Report issued for European Application No. 19183443.1 dated Sep. 24, 2019 (7 pages).

Extended European Search Report issued for European Application No. 21218167.1 dated Mar. 30, 2022 (7 pages).

Non-Final Office Action issued for U.S. Appl. No. 17/214,093 dated Mar. 1, 2023 (12 pages).

Non-Final Office Action issued for U.S. Appl. No. 16/677,501 dated Sep. 30, 2021 (6 pages).

Notice of Allowance issued for U.S. Appl. No. 15/926,322 dated May 21, 2020 (8 pages).

Notice of Allowance issued for U.S. Appl. No. 16/677,501 dated Jan. 11, 2022 (8 pages).

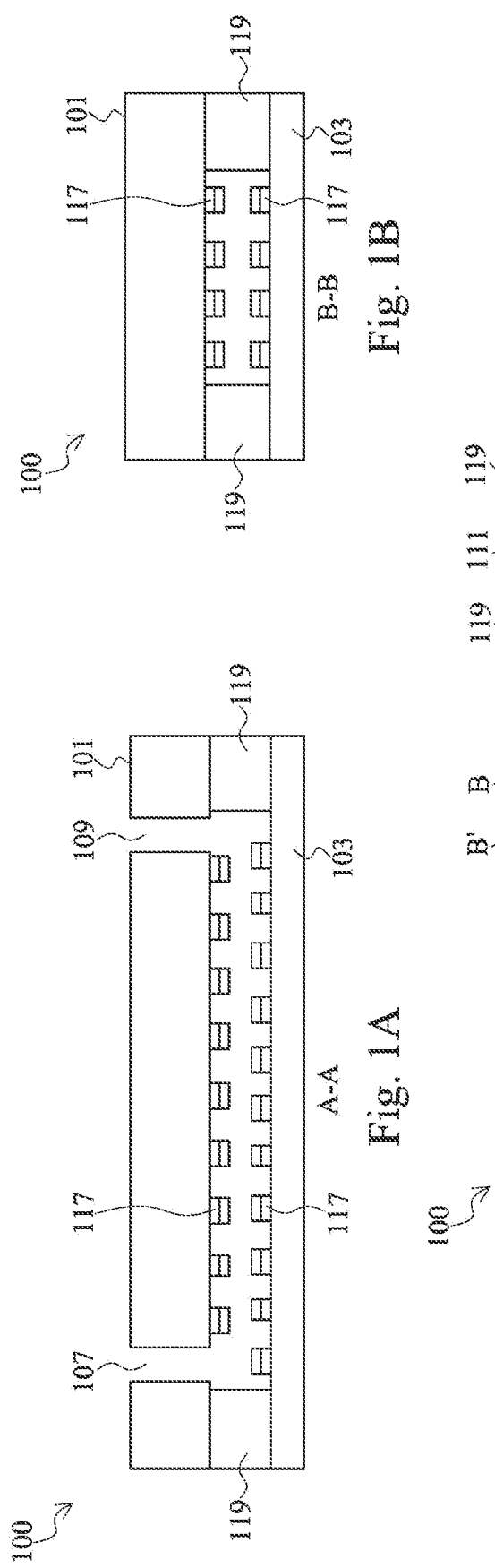
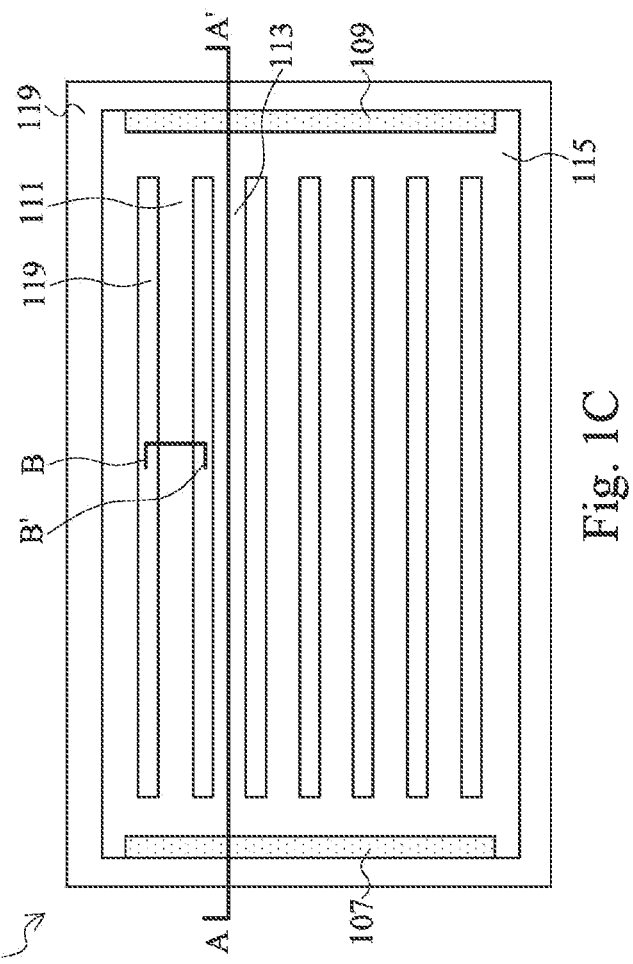

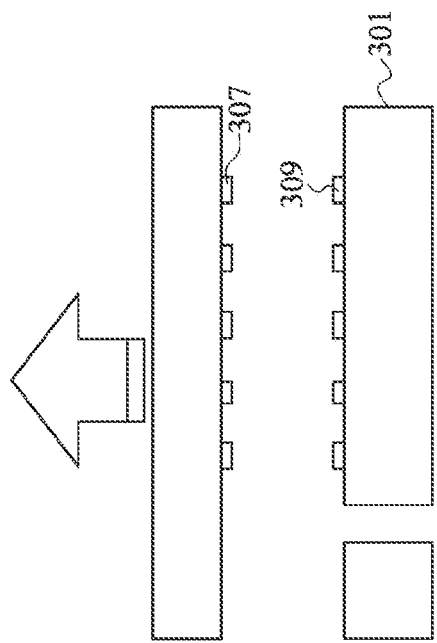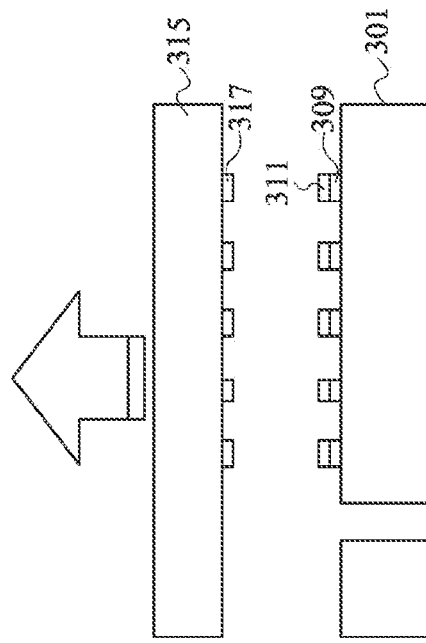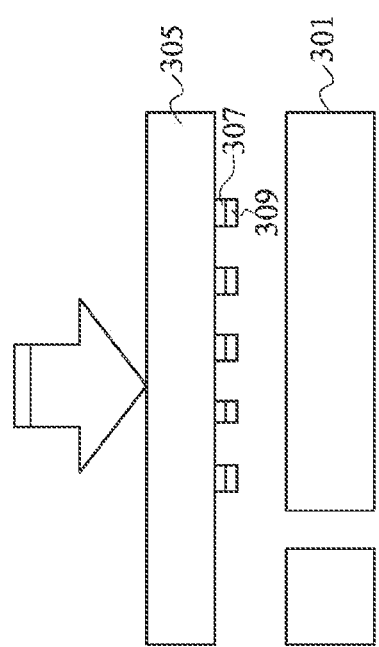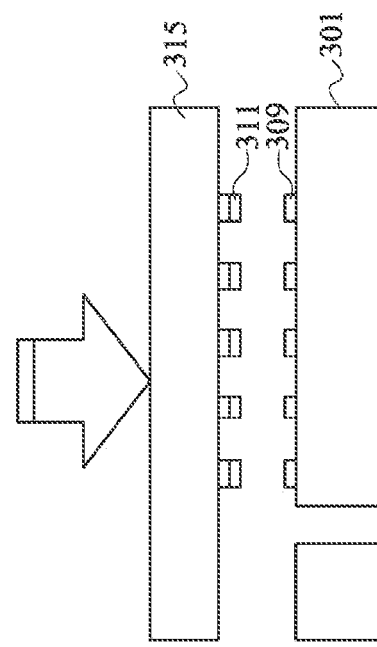

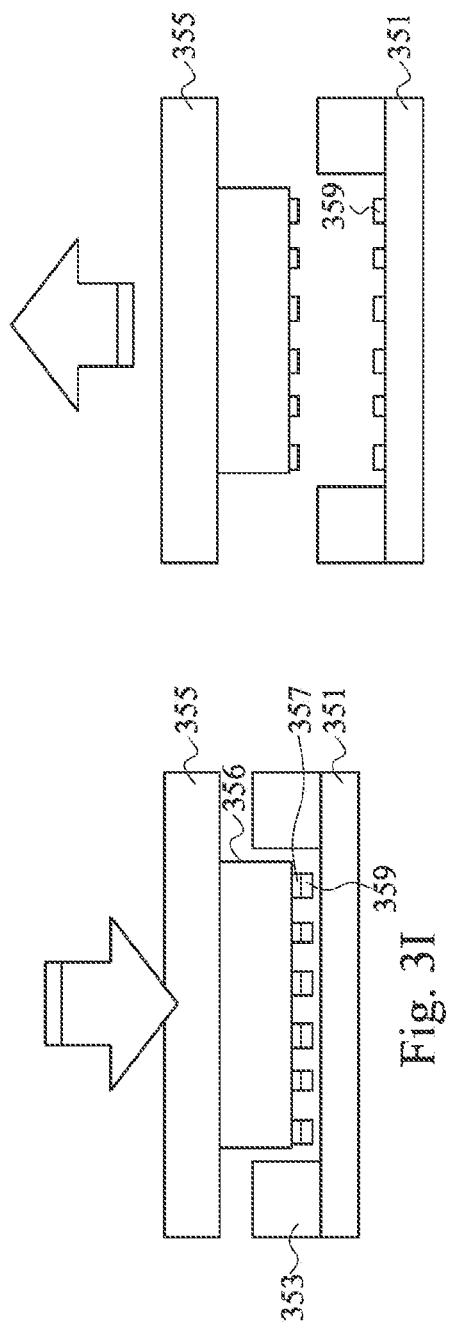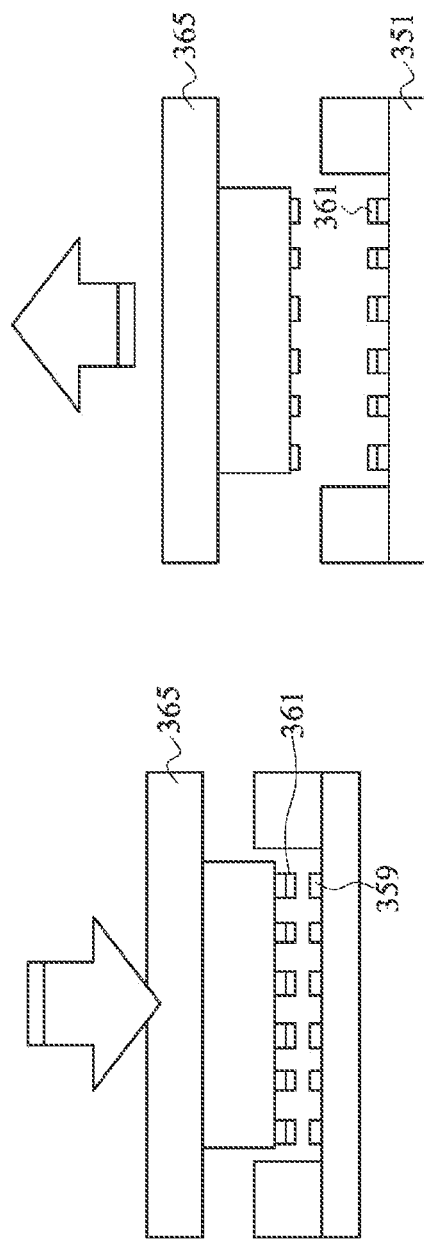

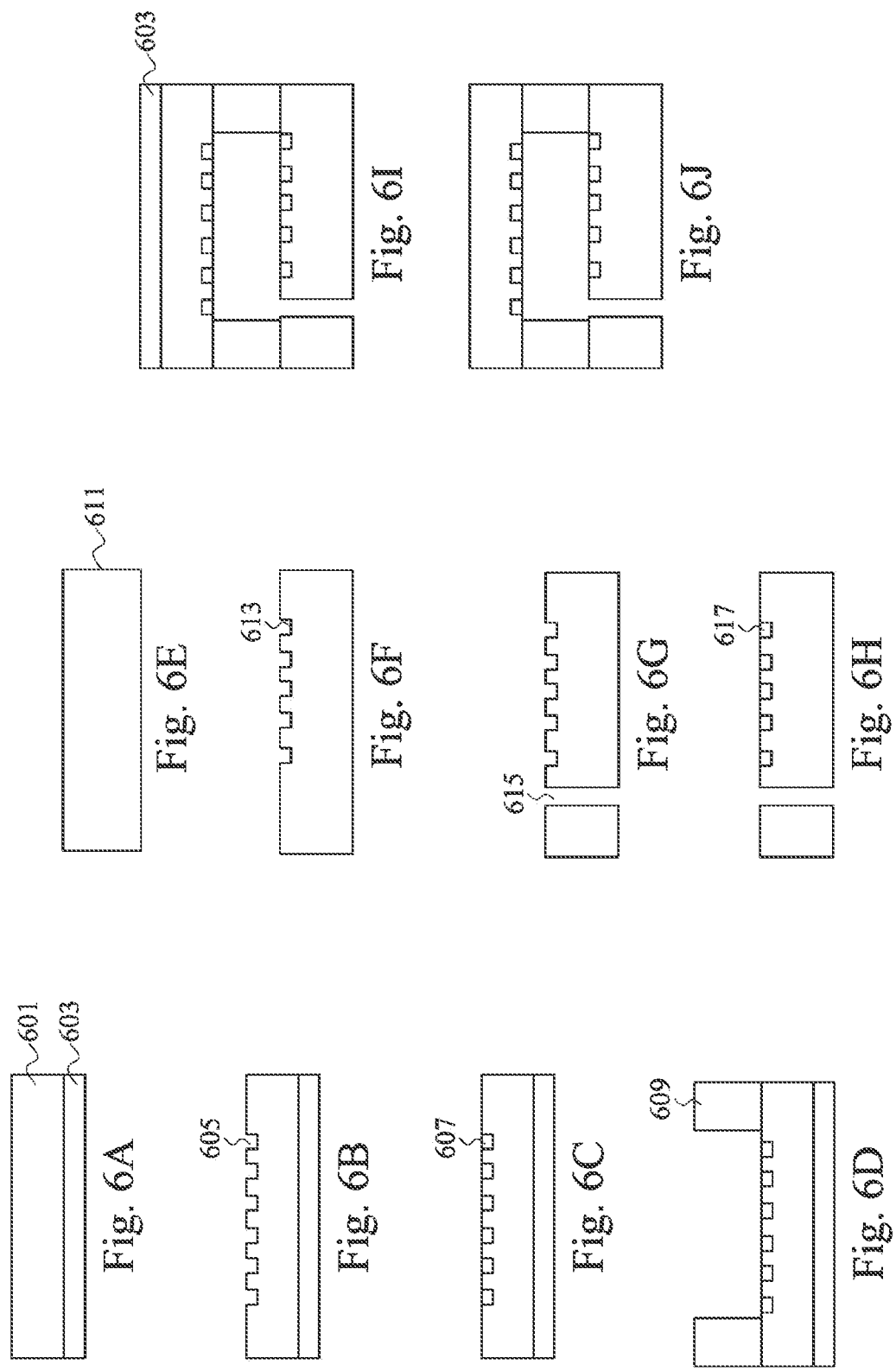

METHOD TO PRODUCE CHEMICAL PATTERN IN MICRO-FLUIDIC STRUCTURE

CROSS-REFERENCE TO RELATED APPLICATIONS

This application is a divisional of U.S. patent application Ser. No. 16/677,501, filed on Nov. 7, 2019, and entitled "Method to Produce Chemical Pattern In Micro-Fluidic Structure" which is a continuation of U.S. patent application Ser. No. 15/603,128, filed May 23, 2017, now U.S. Pat. No. 10,486,153, issued on Nov. 26, 2019, and entitled "Method to Produce Chemical Pattern In Micro-Fluidic Structure" which is a divisional of U.S. patent application Ser. No. 15/167,764, filed on May 27, 2016, now U.S. Pat. No. 9,656,260, issued on May 23, 2017, and entitled "Method to Produce Chemical Pattern In Micro-Fluidic Structure" which is a divisional application of U.S. patent application Ser. No. 14/040,303, filed on Sep. 27, 2013, now U.S. Pat. No. 9,352,315, issued on May 31, 2016, entitled "A Method to Produce Chemical Pattern in Micro-Fluidic Structure," each of which is incorporated herein by reference.

FIELD

This disclosure relates to biosensors and methods for forming biosensors. Particularly, this disclosure relates to micro-fluidic devices and methods for forming them.

BACKGROUND

Biosensors are devices for sensing and detecting biomolecules and operate on the basis of electronic, electrochemical, optical, and/or mechanical detection principles. Biosensors can sense charges, photons, and mechanical properties of bio-entities or biomolecules, or through molecular tags. The detection can be performed by detecting the bio-entities or biomolecules themselves, or through interaction and reaction between specified reactants and bio-entities/biomolecules. Biosensors continue to be miniaturized to reduce sample size while increasing sensitivity and information content.

A flow cell is a type of biosensor that includes microfluidic structures that allows external detection of its contents through a transparent window, for example, with microscopes, spectroscopes, or refractometers. The flow cell includes many capture sites on which biochemical reactions occur. The capture sites may be patterned or unpatterned (randomly distributed) on or in one or several microfluidic channels. Flow cells may be used to analyze biomolecules, conduct reactions, and irradiate samples. For example, flow cells may be used to for deoxyribonucleic acid (DNA) sequencing using fluorescent dyes for optical sensing.

Optical sensing techniques continue to improve, primarily from using better cameras with more pixels and better sensitivity to obtain more information from a flow cell. To benefit from the improved optical sensing techniques, the capture sites in flow cells are further miniaturized using semiconductor processing techniques. Challenges in fabrication of the flow cells using semiconductor processes arise, for example, due to compatibility issues between the semiconductor fabrication processes, the biological applications, and restrictions and/or limits on the semiconductor fabrication processes.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 1A and 1B are a cross section view of a flow cell in accordance with various embodiments of the present disclosure;

FIG. 1C is a top view of a flow cell in accordance with various embodiments of the present disclosure;

FIGS. 3A-3L are cross-sectional views of a flow cell in accordance with various embodiments according to methods of FIGS. 2A and 2B of the present disclosure;

FIGS. 6A-6J cross-sectional views of a flow cell in accordance with some embodiments of the present disclosure.

DETAILED DESCRIPTION

Figure 2A:
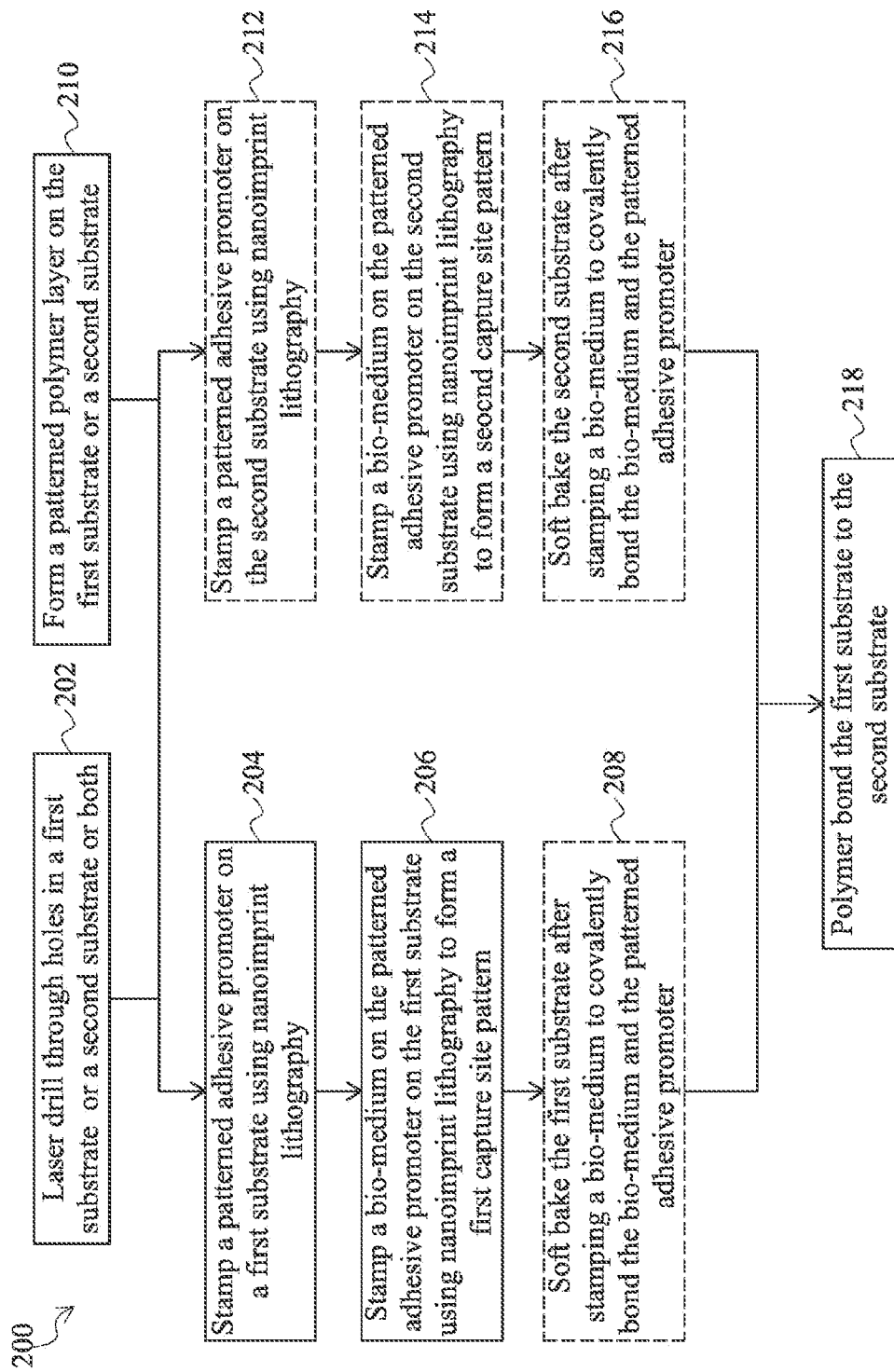
FIGS. 2A and 2B are flow charts of various embodiments of methods of fabricating a flow cell according to one or more aspects of the present disclosure.

It is to be understood that the following disclosure provides many different embodiments, or examples, for implementing different features of the invention. Specific examples of components and arrangements are described below to simplify the present disclosure. These are, of course, merely examples and are not intended to be limiting. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Further still, references to relative terms such as "top", "front", "bottom", and "back" are used to provide a relative relationship between elements and are not intended to imply any absolute direction. Various features may be arbitrarily drawn in different scales for simplicity and clarity.

A flow cell involves various bioreceptors which react with various biological material of interest in one or more patterned capture sites. One such reaction is the polymerase chain reaction (PCR) that can multiply by orders of magnitude the number of molecular strands at a site. Various approaches are used to differentiate among different reactants and reactions for detection. One common approach is to tag a reaction with a fluorescent or phosphorescent label that emits a detectable photon that can be photographed externally. Different tags can be made to emit a different fluorescence, phosphorescence, or otherwise detectable and differentiable radiation. Nature of the detection would be determined based on the type of signal transduced. The signal transduced may be photons, for example, where a different wavelength of light is generated for different biological materials or reactions. In the example of deoxyribonucleic acid (DNA) sequencing, a different color may be emitted for a different DNA-base (i.e., A, G, C, and T).

The bioreceptors are located within various microfluidic channels that deliver biological material to the sensors. The microfluidic channels may be a part of a microfluidic system that includes pumps, valves, and various measurement devices such as flow meters, pressure transducers, and temperature sensors. Combinations of fluid processing and sensing may be advantageously integrated.

Semiconductor processing often involves baking, curing, and exposing various surfaces to plasma energy and radiation energy. At high temperatures (i.e., above about 100 degrees Celsius, or over 150 degree Celsius) and/or high energies, these processes would damage or destroy organic bioreceptors and capture sites, which usually are delicate bio-molecules or very thin layers of surface chemistry. According to various embodiments. the surface modification chemistry of capture sites includes an adhesive promoter layer, for example, hexamethyldisilazane (HMDS) or 3-aminopropyl triethoxysilane (APTES), and a bio-medium layer, for example agar, or hydrogel. In some embodiments, the adhesive promoter layer and the bio-medium layer may be mixed and applied to the surface together. The adhesive promoter, usually a form of silane, attaches to silicon-containing surfaces. The bio-medium layer attaches to the adhesive promoter. Without the adhesive promoter, a bio-medium may detach from a silicon-containing surface.

Thus, the bio-functionalization of surfaces on which bio-molecules are attached, are often performed after all the semiconductor processes are completed to avoid being exposed to the high temperature processes. In some designs, the microfluidic channels are formed directly on a substrate, usually a transparent substrate such as quartz, or an opaque substrate such as a silicon wafer, along with capture sites. At least one side of the flow cell is transparent to allow optical sensing of emitted radiation. By use of the term "transparent," it is not intended that the disclosure be limited to substrates that are 100% light transmissive. Rather, transparent is used herein consistently with common usage by those in the field to indicate transmissivity sufficient to obtain the desired functionality of the resulting device.

In other designs, the microfluidic channels are formed on a microfluidic substrate that is subsequently bonded to another substrate having the capture sites. In the case where the microfluidic channel is in one of the substrates, the microfluidic channel formation, usually etching a trench or via into the substrate, can be difficult to manufacture on a transparent substrate. To avoid damage, when a high temperature bonding process is used, the temperature-sensitive materials are deposited on the interior walls of the microfluidic channels after the bonding process and the microfluidic channels are enclosed. A high concentration of material is flowed through each flow cell through the microfluidic channel surfaces having some affinity for the material. However, the density and thickness of material that attaches to the surfaces are hard to control, and the process is slow and wasteful of the temperature-sensitive material. In some cases, the material density varies throughout the flow cell or a batch of flow cells (not uniform) as the concentrations in the reagents change from inlet to outlet. The random, non-aligned locations and non-uniform concentrations complicate resolution of detectable activities at different sites using image processing algorithms. The locations may overlap each other and are hard to resolve. The randomness also makes it difficult to correlate between different flow cells because each would have different mapping of capture sites.

The various embodiments of the present disclosure contemplate a wafer-level process and a flow cell that addresses many of these issues by avoiding high temperature processing and/or allowing the use of dense patterns of capture sites without traditional photolithography on a transparent substrate. The bioreceptors, for example, DNA primers, are attached to the capture sites after the flow cell is fabricated. The site locations are patterned with an adhesive promoter layer and a bio-medium to form the capture sites. The density issue and the random, non-aligned location issue are addressed by forcing the bioreceptors to attach only at the patterned capture sites. The material selected for capture sites allows certain semiconductor processes to be used in fabricating the flow cell that otherwise cannot be used, for example, with processes that use a low temperature baking and curing. The various method embodiments of the present disclosure may be performed in a semiconductor fabrication facility. In more detail, the processing of materials on transparent substrates such as quartz and glass and etching of transparent substrates are often incompatible with some stages of the CMOS process because, for example, the glass processing can introduce particles that are considered contaminants for other CMOS processes. Some embodiments of the present disclosure involve no glass processing or minimal processing of glass when it is used as a transparent substrate.

In certain embodiments, the flow cell of the present disclosure is formed by combining two substrates, at least one of which is transparent. FIGS. 1A-1C are cross-sectional views and a top view of a flow cell 100 in accordance with some embodiments of the present disclosure. FIG. 1A is a cross-section of the flow cell 100 from sectional line A-A' of FIG. 1C. The view of FIG. 1B is cut from sectional line B-B' of FIG. 1C. Flow cell 100 includes a first substrate 101 bonded to a transparent substrate 103. The first substrate 101 has a microfluidic inlet 107/109 and a microfluidic outlet 109/107. Microfluidic channel patterns are shown as channels 111, 113, and 115. The various channels 111, 113, and 115 are connected to each other via various pathways and may be different sizes depending on the design of the flow cell. The channels include various capture sites 117 on bottom of the channels close to the transparent substrate 103 or top of the channels on the first substrate 101, or both. FIGS. 1A and 1B show the capture sites 117 on both top and bottom of the channels 111 and 113. Capture sites 117 are formed on the first substrate 101 and the transparent substrate 103. The capture sites 117 may have different densities in different channels. In some embodiments, the capture sites 117 on the first substrate 101 and the transparent substrate 103 are aligned in a top view. In other embodiments, the capture sites 117 on the first substrate 101 and the transparent substrate 103 are offset in a top view such that an optical detector sees only one capture site 117 per location.

The capture sites have certain chemistries that allow some material to bind to it. According to various embodiments, a bio-medium on which various bio-materials can bind, including agar or polyethylene glycol (PEG) hydrogel, is disposed on the capture sites. The bio-medium is connected to the capture site on the substrate through an adhesion promotion layer, which may be 3-aminopropyl triethoxysilane (APTES), or hexamethyldisilazane (HMDS).

A bonding polymer layer is disposed between the first substrate 101 and the transparent substrate 103. The bonding polymer layer 119 defines the microfluidic channels 111, 113, and 115 and seals the adjacent microfluidic channels from each other. The bonding polymer layer 119 adheres to both the first substrate 101 and the transparent substrate 103 and also seals the flow cell 100 along the perimeter such that the only access to the microfluidic channels 111, 113, and 115 is through the inlet/outlet 107/109.

FIG. 2A is a flow chart of some embodiments of methods 200 of fabricating a flow cell device according to one or more aspects of the present disclosure. FIGS. 3A to 3L are cross-sectional views of partially fabricated flow cell devices constructed according to one or more steps of the method 200 of FIG. 2A.

In operation 202 of FIG. 2, through holes are laser drilled in a first substrate or a second substrate. Other techniques of forming through-holes include various etching techniques and waterjet drilling. Laser drilling of cylindrical holes generally occurs through melting and vaporization (also referred to as "ablation") of the substrate material through absorption of energy from a focused laser beam. Depending on the direction of the laser energy, the laser drilled through-holes can have an inverse trapezoidal shape in a cross section. In some embodiments, the through-holes are formed by microblasting, or ultrasonic drilling. Microblasting removes material by driving a high velocity fluid stream of air or inert gases including fine abrasive particles, usually about 0.001 in (0.025 mm) in diameter. Ultrasonic drilling involves using high frequency vibrations to hammer a bit through materials. Depending on the process used for forming the through-holes, by products need to be removed from the substrate, by etching or cleaning.

Figure 3A:
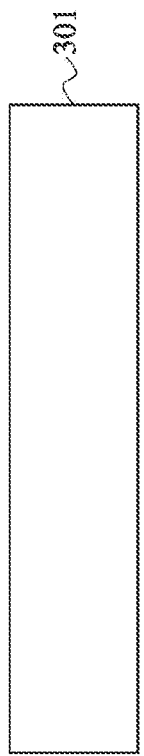
Figure 3B:
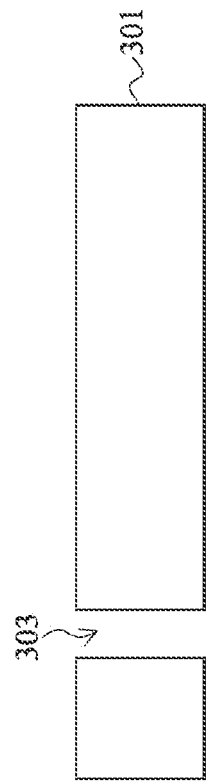

At least two through-holes are formed for every flow cell—an inlet and an outlet. More than two through-holes may be used for different inlet fluids or if the flow cell performs separation of the analyte and more than one outlet is used. The through holes may be formed on separate substrates or the same substrate. Two through holes may be formed on the same substrate, either the first substrate or the second substrate. FIG. 3A is a cross sectional diagram of a substrate 301 before the through-holes is formed. FIG. 3B is a cross sectional diagram of a substrate 301 having a through-holes 303 therein.

In operations 204 to 208, a number of first capture sites is formed on a first substrate. In operation 204, a nanoimprint lithography (NIL) stamp stamps a patterned adhesive promoter on a first substrate. In an NIL process, a sample liquid, also called ink, is transferred to a planar target surface in a stamping motion. The stamp may be a silicone material such as polydimethylsiloxane (PDMS), a silicon material, or a silicon oxide material. The island features are formed by molding, photolithographic patterning, or ion beam patterning. Depending on the process used, the island features may be small with a small pitch. For example, the island features may be tens of angstroms across with a pitch in the same range. In some examples, each island may have a width and a length of about 10 to 50 angstroms. In other examples, each island may have a width and a length of about 50 to 200 angstroms. The island size is determined from the use of the flow cell. For DNA sequencing where smaller clusters are detectable by the optical sensing instruments, the island features may be about 20 angstroms. If the flow cell is used to work with cells or large biomolecules, larger islands may be used.

The island features contact the liquid sample in a reservoir, much like a stamp first contacts an ink well. Some liquid sample is retained on the island surface by the island feature. The stamp is then pressed onto a surface of the substrate to transfer at least a portion of the liquid sample from the island surface to the substrate surface. FIG. 3C shows the first substrate 301 and a NIL stamp 305 over the first substrate 301. The first substrate 301 may be quartz, silicon, sapphire, silicon carbide, or transparent or non-transparent substrates that do not react with the analyte. The NIL stamp 305 includes many island features 307 having an adhesive promoter 309 on its surface. The adhesive promoter is a liquid chemical that bonds to the substrate 301, for example, a silane-based or thio-based molecule, and can bond to a bio-medium to anchor the bio-medium to the substrate. In some embodiments, the adhesion promoter is HMDS or APTES.

The NIL stamp 305 makes contact with the first substrate 301 and is lifted as shown in FIG. 3D. A portion of the adhesive promoter 309 is left behind and forms an adhesive promoter imprint on the first substrate 301. The adhesive promoter imprint may be a monolayer. The patterned adhesive promoter 309 on the first substrate has the same pattern as the island features 307 on the NIL stamp 305. The adhesive promoter transfer may not be complete, some adhesive promoter material may be left on the island features 307. Further, while adhesive promoter 309 is inked only on the island features 307 in FIG. 3C, the adhesive promoter 309 may be present in the valley areas of the NIL stamp 305 between the island features 307. However, because only the island feature surface contacts the first substrate 301, the additional adhesive promoter 309 between the island features does not affect the pattern imprinted.

In operation 206 of FIG. 2A, an NIL stamp stamps a bio-medium on the patterned adhesive promoter on the first substrate. The adhesive promoter and the bio-medium form a capture site. The patterned adhesive promoter and the bio-medium on the patterned adhesive promoter form a capture site pattern. The NIL stamp used to stamp the bio-medium may be the same NIL stamp used to stamp the adhesive promoter or a different NIL stamp having the same island feature pattern. FIG. 3E shows the first substrate 301 and a NIL stamp 315 over the first substrate 301. The NIL stamp 315 includes many island features 307 with bio-medium material 311 on the surface. The bio-medium material is a support medium that can bind to primers for performing reactions in the flow cell. The bio-medium may be a natural or a synthetic material. In some embodiments, the bio-medium material is agar or a hydrogel, for example, polyethylene glycol (PEG) hydrogel.

The NIL stamp 315 makes contact with the first substrate 301 and is lifted as shown in FIG. 3F. A portion of the bio-medium 311 is left behind on the adhesive promoter 309 on the first substrate 301. Because the bio-medium 311 is stamped directly on the adhesive promoter pattern 309, the NIL stamp 315 is aligned carefully with the adhesive promoter pattern 309. The bio-medium 311 stamping may be performed more than once to increase the thickness of the bio-medium 311 layer. The patterned bio-medium 311 on the first substrate has the same pattern as the island features 317 on the NIL stamp 315. In some embodiments, the NIL stamp 305 of FIG. 3C and the NIL stamp 315 of FIG. 3E formed of different materials having the same island feature pattern. The bio-medium transfer may not be complete, some bio-medium material may be left on the island features 317. Further, while bio-medium 311 is inked only on the island features 317 in FIG. 3E, the bio-medium 311 may be present in the valley areas of the NIL stamp 315 between the island features 317. However, because only the island feature surface contacts the first substrate 301, the additional bio-medium 311 between the island features does not affect the pattern imprinted.

Depending on the particular materials used for the adhesive promoter and for the bio-medium, the substrate may be baked at a relatively low temperature to covalently bond the bio-medium and the adhesive promoter. In some embodiments, the covalent bonds are formed at a temperature of 40 degrees Celsius to 200 degrees Celsius. In some embodiments, the materials are irradiated to promote the covalent bonding using UV/Vis/IR light for curing. A capture site includes an adhesive promoter layer and a bio-medium layer bonded over the adhesive promoter layer.

Figure 3G:
Figure 3H:
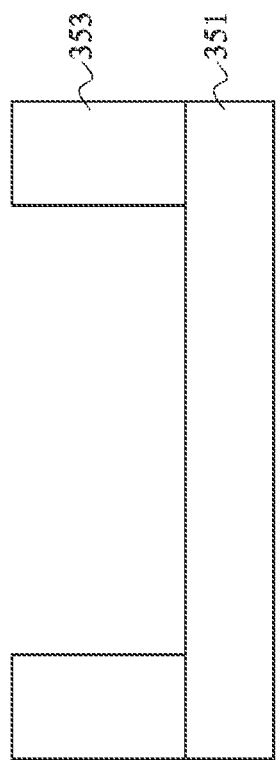

Referring back to FIG. 2A, in operation 210, a patterned polymer layer is formed on the first substrate or a second substrate. The patterned polymer layer may be formed before or after the capture sites are formed. In some embodiments, the polymer layer is formed by using a photoresist (PR) dry film. A PR dry film is applied to a substrate, either the first substrate or the second substrate. The PR dry film is then exposed to a patterned light and developed to remove an unexposed portion of the PR dry film. In some embodiments, the exposed portion is removed, depending on the type of PR dry film. The developer used to dissolve the PR dry film is selected to be bio-compatible. The PR film has a low solvent content, so it would harden with a low temperature bake at less than 100 degrees Celsius, for example, at about 90 degrees Celsius. At low temperatures, already formed capture sites would not be harmed. The patterned polymer layer becomes the walls of the microfluidic channels as well as sealing the flow cell. FIGS. 3G and 3H are cross sectional diagrams of a substrate 351 before and after forming the patterned polymer layer 353. The patterned polymer layer 353 has a thickness between about 10 microns to hundreds of microns. For example, the patterned polymer layer 353 may be about 100 microns.

Referring back to FIG. 2A, operations 212 to 216 on the second substrate (FIGS. 3I to 3L) mirror operations 204 to 208 on the first substrate (FIGS. 3C to 3F), with a different NIL stamp shape. Operations 212 to 216 are used when capture sites are formed on the second substrate. When a patterned polymer layer is formed before the capture sites, the NIL stamp is shaped appropriately to be inserted between the polymer patterns. According to some embodiments, the polymer layer pattern is used to align the NIL stamp. Referring to FIG. 3I, the NIL stamp 355 having a channel base 356, island features 357, and an adhesive promoter 359 is inserted between polymer pattern 353 to stamp an adhesive promoter 359 on the second substrate 351. In some embodiments, the channel base 356 has an angled side or two angled sides so as to form a trapezoidal shape to align the NIL stamp 355 to the microfluidic channel during stamping. In FIG. 3J, the NIL stamp 355 is lifted from the second substrate 351, leaving a patterned adhesive promoter 359 on the second substrate 351. In FIG. 3K, an NIL stamp 365 stamps a bio-medium 361 on the adhesive promoter 359. In FIG. 3L, the NIL stamp 365 is lifted from the second substrate 351, leaving bio-medium 361 behind. Operation 216 is the same as operation 208 and may be used if the materials in the capture site are bonded by a soft baking operation. In the embodiments illustrated, a patterned polymer layer is formed on both the first and the second substrate. In other embodiments, a patterned polymer layer could be formed on only one of the first or the second substrate, and then bonded to the other of the second or first substrate.

Figure 2B:
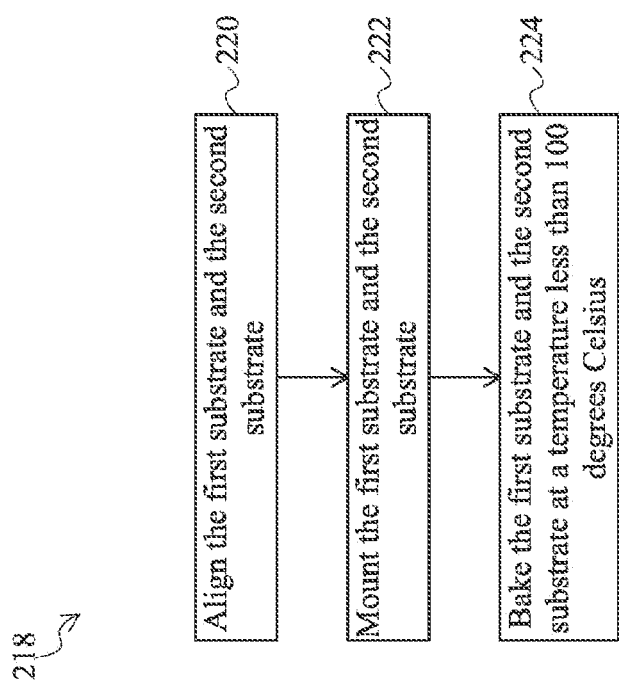

Referring back to FIG. 2A, in operation 218, the first substrate and the second substrate are bonded via the patterned polymer layer on the first substrate or the second substrate. In some embodiments, the patterned polymer layers are formed on both the first substrate and the second substrate in a non-overlapping or an overlapping matter. The overlapping embodiment may be used to increase the height of microfluidic channels. FIG. 2B is a process flow diagram showing operation 218 in more detail. In operation 220, the first substrate and the second substrate are aligned. The alignment may be performed by alignment marks on the first substrate and the second substrate. If used, the alignment marks are disposed in areas on the substrates outside of the flow cells. The alignment marks may be disposed in scribe areas that will be subsequently removed when the bonded substrates are diced. The alignment marks may also be a part of the flow cells. For example, the alignment may be performed using the patterned polymer layer as the alignment marks.

In operation 222, the first substrate and the second substrate are mounted. In some embodiments, a transparent substrate is mounted on a non-transparent substrate when the alignment sensor can use features on the non-transparent substrate detectable through the transparent substrate. After the substrates are mounted, in operation 224, the first substrate and the second substrate are baked at a temperature less than 100 degrees Celsius, with or without a downward pressure during the baking. In addition or instead of baking, an ultraviolet (UV) light may be applied to facilitate bonding of the polymer layer to a substrate. Once bonded, the patterned polymer layer forms a seal against the substrate bonded. The bonding operation may include one or many of baking, mechanical pressure application, and UV light. In certain embodiments, the UV light may be patterned so its application is directed toward the areas of the polymer layer and not directed toward capture sites. The photomask used for forming the patterned polymer layer may be used to pattern the UV light.

After the bonding operation, any backside tape or handling apparatus is removed from the bonded substrates. In one embodiment, an UV tape is applied to one of the substrates to facilitate handling. The UV light that bonds the substrate and the polymer layer can also degrade the adhesive on the tape to render it easily removable. After the bonding operation, the substrates may be diced or singulated to form individual flow cells as shown in FIGS. 1A to 1C. The tape removal may occur before or after the singulation. The flow cell thus formed has patterned capture sites having small dimensions and high density to enable more information to be captured during the biological reaction, such as DNA sequencing. The time to sequence a target is reduced. The NIL stamping process allows the patterned polymer layer to be formed on a substrate before the capture sites are formed, reducing the likelihood that developer chemicals or other parts of the photolithography process used for the PR dry film affect the chemicals on the capture sites. Further a potentially damaging operation of using chemical mechanical polishing (CMP) to form capture sites in etched divots is avoided. This method also allows the use of transparent substrates in the semiconductor fab without contamination issues from etching of glass or quartz substrates.

Figure 4:
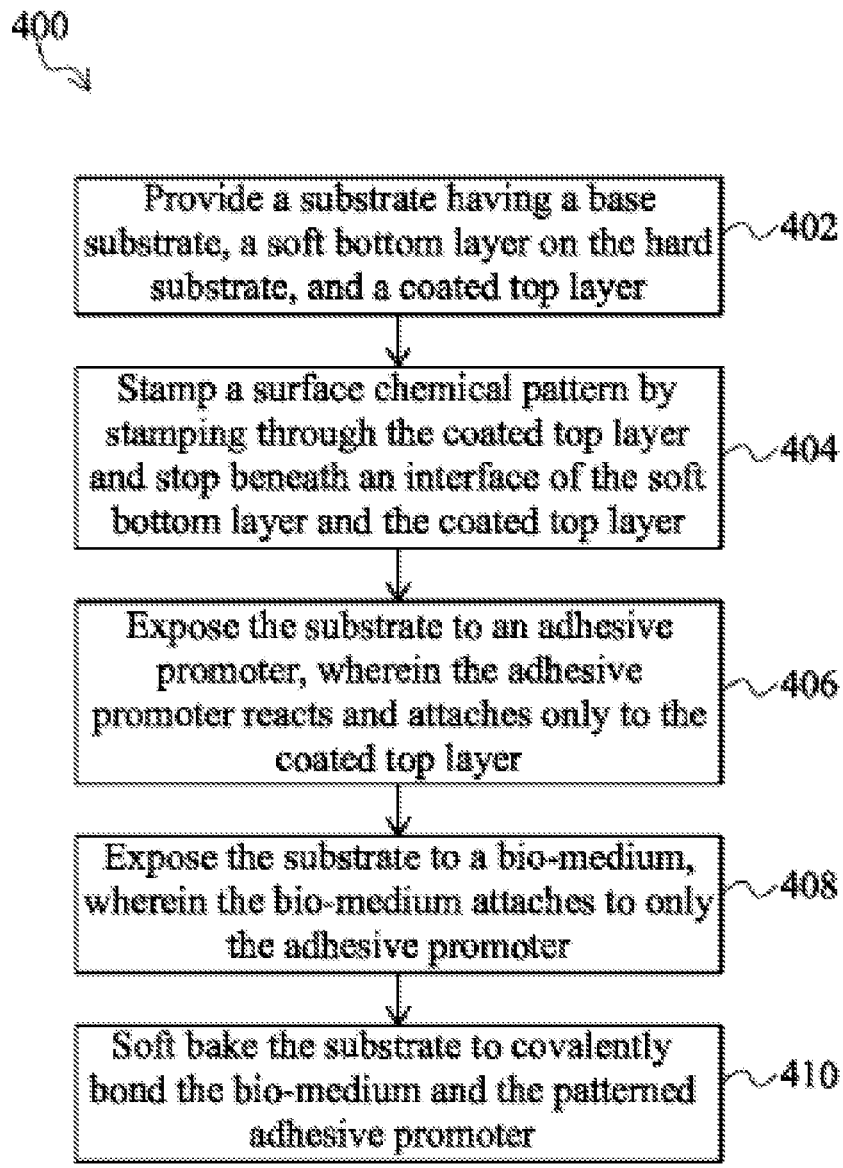
FIG. 4 is a flow chart of some embodiments of methods of fabricating a flow cell according to one or more aspects of the present disclosure.

The present disclosure also pertains to alternate methods of forming capture sites on a substrate using an NIL process. FIG. 4 is a process flow of the method 400 to form capture sites. Cross sectional diagrams in FIGS. 5A to 5E correspond to various operations in method 400. In operation 402, a substrate is provided having a base substrate, a soft bottom layer on the base substrate, and a coated top layer.

Figure 5A:
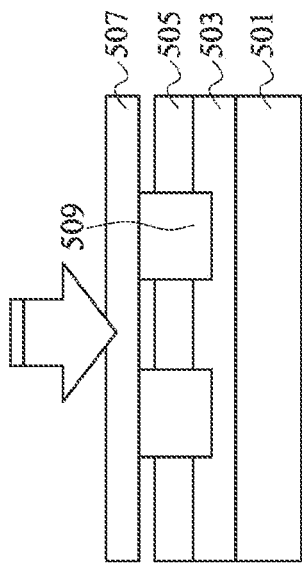
FIGS. 5A-5E are cross-sectional views of a flow cell in accordance with various embodiments according to methods of FIG. 4 of the present disclosure.

FIG. 5A is a cross section of substrate 500 including the base substrate 501, the soft bottom layer 503 and a coated top layer 505. The base substrate 501 may be a transparent substrate or a non-transparent substrate. The soft bottom layer 503 is softer than an NIL stamp and allows the NIL stamp to deform the soft bottom layer 503. The soft bottom layer 503 may be a thermal plastic resin or a metal layer. The metal layer may include one or more of aluminum, copper, titanium, and an alloy of these. The soft bottom layer 503 has a thickness between about 3 microns to about 10 microns. The soft bottom layer 503 may be deposited on the substrate 501 using semiconductor deposition processes including physical vapor deposition (PVD), chemical vapor deposition (CVD), or spin-on processes. The coated top layer 505 is a silicon oxide having a thickness between about 1000 angstroms to about 5000 angstroms. The top coated layer 505 may be a spin-on glass (SOG) deposited using spin-on processes. The SOG may be partially cured or fully cured and is thin and soft to allow an NIL stamp to punch through.

Figure 5B:
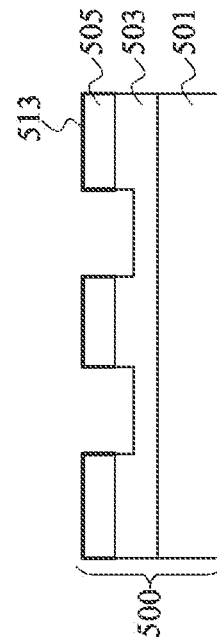

In operation 404 of FIG. 4, a surface chemical pattern is formed by stamping an NIL stamp through the coated top layer and stopping beneath an interface of the soft bottom layer and the coated top layer. FIG. 5B includes an NIL stamp 507. In the process of tamping. The NIL stamp 507 punches through the coated top layer 505, forms an indentation in the soft bottom layer 503, and stops without reaching the base substrate 501. The NIL stamp 507 may be a silicon material, a silicon oxide material, a sapphire, or other hard material that can be patterned to form punch features 509. The punch features 509 are formed by photolithographic patterning, or ion beam patterning. Depending on the process used, the punch features 509 may be small with a small pitch. For example, the punch features 509 may be tens of angstroms across with a pitch in the same range. In some examples, each punch feature 509 may have a width and a length of about 10 to 50 angstroms. In other examples, each punch feature 509 may have a width and a length of about 50 to 200 angstroms. The punch feature pitch size is determined from the use of the flow cell. For DNA sequencing where smaller clusters are detectable by the optical sensing instruments, the punch feature pitch may be about 40 angstroms. If the flow cell is used to work with cells or large biomolecules, larger pitch may be used. The punch features 509 have thickness determined by the thicknesses of the coated top layer 505 and the soft bottom layer 503. Because the stamping is designed to stop before reaching the base substrate 501, the punch feature thickness is less than the sum of the coated top layer 505 and the soft bottom layer 503.

The punch features 509 surfaces may be treated to increase its hardness and to ensure that it does not bond during the stamping operation to the material on substrate 500. For example, an additional baking operation at about 200-460 degrees Celsius or UV curing may be used to harden punch features. The substrate 500 may be cleaned after the stamping operation to ensure that no silicon oxide material remains at the bottom of the openings 511. The NIL stamp 507 is inspected and replaced if necessary to ensure mechanical integrity during the stamping operation.

Figure 5C:
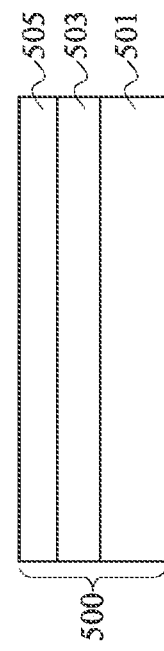

The NIL stamp 507 is lifted as shown in FIG. 5C, leaving openings 511 in the substrate 500 in the coated top layer 505 and soft bottom layer 503. The remaining portions of the coated top layer 505 are the surface chemical pattern. Capture sites are formed on the surface chemical pattern in subsequent operations. Therefore, the punch feature size does not define the size of the capture sites; rather, the spacing between the punch feature size defines the capture site size.

Referring to FIG. 4, in operation 406 the substrate is exposed to an adhesive promoter that reacts and adheres only to the coated top layer. According to various embodiments, the soft bottom layer does not form a bond with the adhesive promoter. In some embodiments, the soft bottom layer is selected to be non-wetting with respect to the adhesive promoter. The substrate may be exposed to the adhesive promoter through a spin and rinse processes. The adhesive promoter selectively adheres to silicon-containing surfaces, especially the patterned coated top layer of silicon oxide. The soft-bottom layer covers and protects the underlying base substrate from the adhesive promoter. Next, in operation 408, the substrate is exposed to a bio-medium that attaches only to the adhesive promoter. Each patterned feature of the coated top layer becomes a capture site having an adhesive promoter layer and a bio-medium thereon.

Figure 5D:
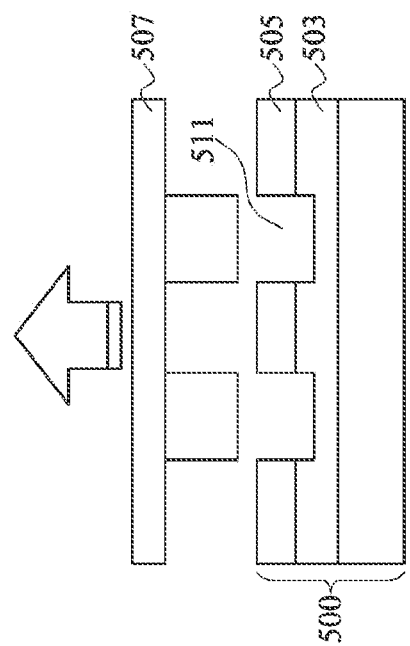

FIG. 5D is a cross sectional diagram of substrate 500 after the adhesive promoter 513 is attached to the patterned coated top layer. As shown, the adhesive promoter 513 is attached to the top and sides of the patterned coated top layer, which is a silicon oxide island over an outcrop of the soft bottom layer. The capture site is three-dimensional, as a box or a cylinder. In some embodiments, the capture site has a top surface and four sidewalls. In other embodiments, the capture site has a top surface and a circumferential sidewall. The three-dimensional shape allows more surface area to be used as capture site as compared to a two-dimensional capture site having only a top surface.

Figure 5E:
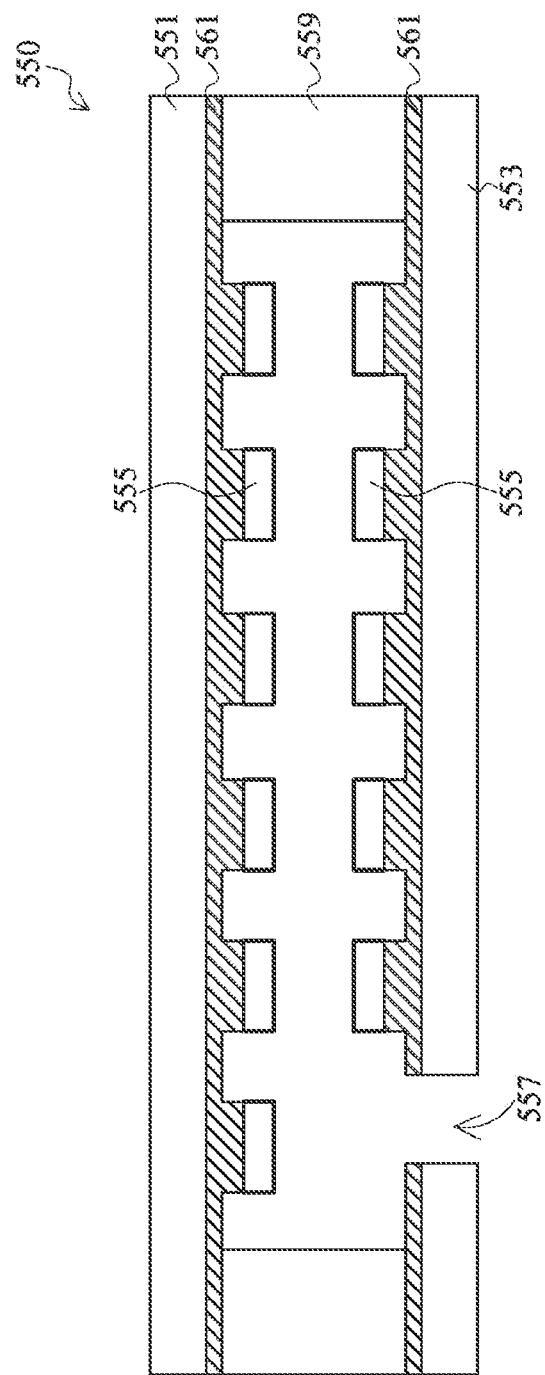

In operation 410, the substrate is soft baked to covalently bond the bio-medium and the patterned adhesive promoter. Operation 410 is the same as operation 208 of FIG. 2A. After operation 410 the capture sites are formed on the substrate. The method 400 of FIG. 4 may be used to prepare capture sites on one or more substrates. FIG. 5E is a cross section diagram of a flow cell 550. The flow cell 550 includes two base substrates 551 and 553, both with capture sites 555. The base substrate 551, soft bottom layer 561, and capture sites 555 is the first substrate. The base substrate 553, soft bottom layer 561, and capture sites 555 is the second substrate. Each capture site 555 includes a silicon oxide island formed from the coated top layer over an outcrop of the soft bottom layer 561 formed from the stamping operation.

The base substrate 553 includes a through hole 557, which may be formed after the soft bottom layer and optionally the coated top layer is deposited. Although only one through hole 557 is illustrated, embodiments are contemplated wherein two or more through holes are formed. A patterned polymer layer 559 is disposed between the first substrate and the second substrate and defines microfluidic channel walls. The polymer bonding process of operation 218 of FIGS. 2A and 2B is used to attach the patterned polymer layer. While FIG. 5E shows the patterned polymer layer disposed between two soft bottom layers 561, other embodiments may involve the patterned polymer layer directly contacting the base substrates 551 and 553.

In some embodiments, capture sites are formed after the substrates are bonded. After the stamping operation 404 of FIG. 4, the substrates are bonded using the patterned polymer layer. Then the capture sites are completed by flowing the adhesive promoter layer and/or the bio-medium. Because the exposed coated top layer bonds with the adhesive promoter material selectively, the adhesive promoter may be flowed through the microfluidic channel, rinsed, and then the bio-medium material may be flowed through the microfluidic channel and rinsed. This alternate embodiment has an advantage of not exposing the chemicals of the capture sites to any elevated temperature; however, the thicknesses of different layers on the capture site would be difficult to control.

According to some embodiments, a flow cell may include recessed capture sites as shown in FIGS. 6A to 6J. In FIG. 6A, a transparent substrate 601 and a handling apparatus 603 is provided. The handling apparatus (opaque layer) may be a tape/polymer or deposited multi-layer films by PVD/CVD or another substrate bonded to the transparent substrate 601. In FIG. 6B, a number of recesses 605 are formed on the substrate. In some examples, the recesses 605 are formed by patterning and etching the transparent substrate 601. In FIG. 6C, capture sites 607 are formed in the recesses. In some embodiments, the capture sites 607 are formed by sequential NIL stamping of an adhesive promoter and a bio-medium. In other embodiments, the capture sites 607 are formed by a combination NIL stamping of a mixture of adhesive promoter and bio-medium. In still other embodiments, the capture sites 607 are formed by sequential deposition of an adhesive promoter and a bio-medium and a CMP to remove portions not in the recesses. In FIG. 6D, a patterned polymer layer 609 is formed on the transparent substrate 601 according to previously described operation 210 of FIG. 2A.

In FIG. 6E, a second substrate 611 is provided. The second substrate 611 may be transparent or not. In FIG. 6F, recesses 613 are formed in the second substrate 611 in a similar process as forming recesses 605 in the first substrate 601. In FIG. 6G, one or more through holes 615 are formed in the second substrate 611, in a similar process as described in association with operation 202 of FIG. 2A. In FIG. 6H, capture sites 617 are formed in the second substrate 611 in a similar process as forming capture sites 607 in the first substrate.

In FIG. 6I, the two substrates from FIG. 6D and FIG. 6H are bonded using a polymer bonding process as described in association with operation 218 of FIG. 2A. In FIG. 6J, the handling apparatus 603 is removed from the flow cell of FIG. 6I.

According to various embodiments, the capture sites in a flow cell may have a relatively flat surface (FIGS. 1A to 1C), a protruding three-dimensional (3-D) structure (FIG. 5E), or a recessed structure (FIG. 6J). Each capture site configuration may be manufactured using a NIL stamping process as described. In one flow cell, the capture sites on one side may have a different configuration from the other side. For example, in some embodiments, one side of the flow cell may have a protruding 3-D capture site while the opposite side may have recessed capture sites. Capture site design consideration includes the intended flow rates in the microfluidic channel, size of the biological sample, the nature of intended reaction in the flow cell, the importance of maximizing surface area or separating clusters, manufacturing cost, among others.

One aspect of the present disclosure pertains to a method of manufacturing a flow cell that includes forming stamping a patterned adhesive promoter on a first substrate using nanoimprint lithography, stamping a bio-medium on the patterned adhesive promoter on the first substrate using nanoimprint lithography to form a first capture site pattern, forming a patterned polymer layer on the first substrate or a second substrate, and polymer bonding the first substrate to the second substrate. The first substrate or the second substrate or both substrates are transparent. The method may also include soft baking the first substrate after stamping a bio-medium to covalently bond the bio-medium and the patterned adhesive promoter. In some embodiments, the method also includes stamping a patterned adhesive promoter on the second substrate using nanoimprint lithography and stamping a bio-medium on the patterned adhesive promoter on the second substrate using nanoimprint lithography to form a second capture site pattern. The first capture site pattern and the second capture site pattern may be aligned in a top view. In some embodiments, the method also includes laser drilling one or more through holes in the second substrate. The polymer bonding operation may include aligning the first substrate and the second substrate, mounting the first substrate and the second substrate, and baking the first substrate and the second substrate at a temperature less than 100 degrees Celsius.

Another aspect of the present disclosure pertains to a method of manufacturing a flow cell. The method includes providing a first substrate having a base substrate, a soft bottom layer on the base substrate, and a coated top layer, stamping a surface chemical pattern by stamping through the coated top layer and stop beneath an interface of the soft bottom layer and the coated top layer, exposing the first substrate to an adhesive promoter, exposing the first substrate to a bio-medium, forming a patterned polymer layer on the first substrate or a second substrate, and polymer bonding the first substrate to the second substrate. The adhesive promoter reacts and attaches only to the coated top layer and the bio-medium attaches to only the adhesive promoter. The first substrate or the second substrate or both substrates are transparent. In some embodiments, the coated top layer is a spin-on-glass (SOG) oxide. In some embodiments, the soft bottom layer is a thermal plastic resin.

The present disclosure also pertains to a flow cell having a transparent substrate and a bottom substrate, which may or may not be transparent. One of the substrates has through holes. The flow cell also includes a patterned photoresist dry film between the first substrate and the second substrate. The patterned polymer layers form microfluidic channel walls between the first substrate and the substrate. A plurality of patterned capture sites within microfluidic channels on the first substrate, the second substrate, or both. The plurality of capture sites each comprises a patterned adhesive promoter and a bio-medium. The patterned adhesive promoter and the bio-medium may be covalently bonded. The patterned capture sites may be disposed on a surface chemical pattern having silicon oxide islands each disposed on an outcrop of a soft bottom layer over a base substrate. The soft bottom layer may be aluminum, copper, titanium, an alloy of these, or a combination of these or a thermal plastic resin. The plurality of patterned capture sites may be recessed into the first substrate, the second substrate, or both, formed directly on a planar surface of the first substrate, the second substrate, or both. The first substrate and the second substrate may be about or less than 1 mm thick and may be formed of quartz. The bio-medium is a hydrogel.

In describing one or more of these embodiments, the present disclosure may offer several advantages over prior art devices. In the discussion of the advantages or benefits that follows it should be noted that these benefits and/or results may be present is some embodiments, but are not required in every embodiment. Further, it is understood that different embodiments disclosed herein offer different features and advantages, and that various changes, substitutions and alterations may be made without departing from the spirit and scope of the present disclosure.

What is claimed is:

1. A method of forming a flow cell, the method comprising:
    attaching a first substrate that comprises a first plurality of recesses in each of which a biological capture site is disposed to a second substrate via a polymer layer, and
    before attaching the first substrate to the second substrate, forming the biological capture site in each of the recesses.

2. The method of claim 1, wherein each capture site comprises an adhesive promoter and a bio-medium.

3. The method of claim 2, wherein forming the biological capture site in each of the recesses comprises:
    depositing the adhesive promoter at least in the first plurality of recesses of the first substrate, and depositing the bio-medium on the adhesive promoter in the first plurality of recesses of the first substrate.

4. The method of claim 2, wherein forming the biological capture site in each of the recesses comprises:
depositing the adhesive promoter in the first plurality of recesses of the first substrate and on portions of the first substrate around the first plurality of recesses,
depositing the bio-medium on the adhesive promoter, and
removing at least portions of the adhesive promoter that are not in the first plurality of recesses of the first substrate.

5. The method of claim 4, wherein the step of removing at least portions of the adhesive promoter that are not in the first plurality of recesses of the first substrate is performed by chemical-mechanical polishing (CMP).

6. The method of claim 2, wherein the bio-medium is a hydrogel.

7. The method of claim 2, wherein the adhesive promotor is a silane-based adhesive promotor.

8. The method of claim 2, wherein the adhesive promotor comprises hexamethyldisilazane or 3-aminopropyl triethoxysilane.

9. The method of claim 1, wherein the second substrate comprises a second plurality of recesses in each of which a biological capture site is disposed.

10. A method of forming a flow cell, the method comprising:
attaching a first substrate that comprises a first plurality of recesses in each of which a biological capture site is disposed to a second substrate via a polymer layer, wherein the second substrate comprises a second plurality of recesses in each of which a biological capture site is disposed.

11. The method of claim 10, wherein each capture site comprises an adhesive promoter and a bio-medium.

12. The method of claim 11, wherein forming the biological capture site in each of the recesses comprises:
depositing the adhesive promoter at least in the first plurality of recesses of the first substrate, and
depositing the bio-medium on the adhesive promoter in the first plurality of recesses of the first substrate.

13. The method of claim 11, wherein forming the biological capture site in each of the recesses comprises:
depositing the adhesive promoter in the first plurality of recesses of the first substrate and on portions of the first substrate around the first plurality of recesses,
depositing the bio-medium on the adhesive promoter, and
removing at least portions of the adhesive promoter that are not in the first plurality of recesses of the first substrate.

14. The method of claim 13, wherein the step of removing at least portions of the adhesive promoter that are not in the first plurality of recesses of the first substrate is performed by chemical-mechanical polishing (CMP).

15. The method of claim 11, wherein the bio-medium is a hydrogel.

16. The method of claim 11, wherein the adhesive promotor is a silane-based adhesive promotor.

17. The method of claim 11, wherein the adhesive promotor comprises hexamethyldisilazane or 3-aminopropyl triethoxysilane.

* * * * *